Aug. 27, 1935.  G. E. FRIEDRICH  2,012,559
BUTCHER'S MEAT COOLER
Filed April 16, 1934  4 Sheets-Sheet 4
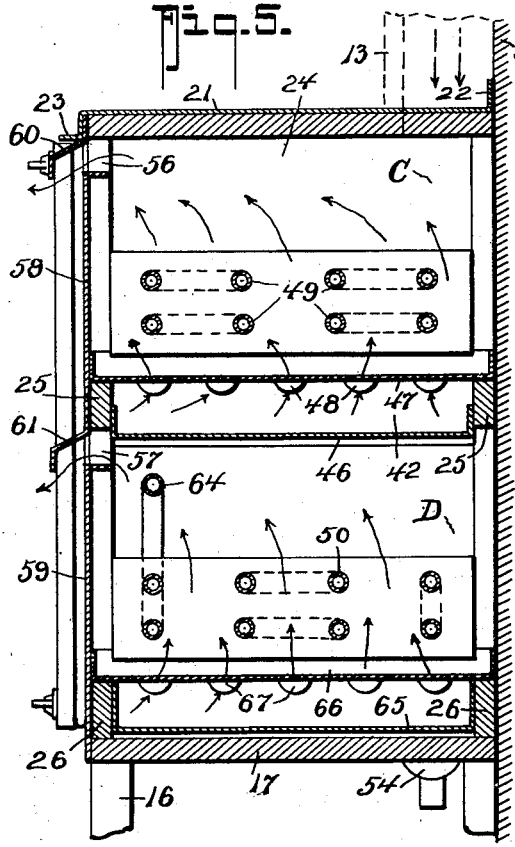
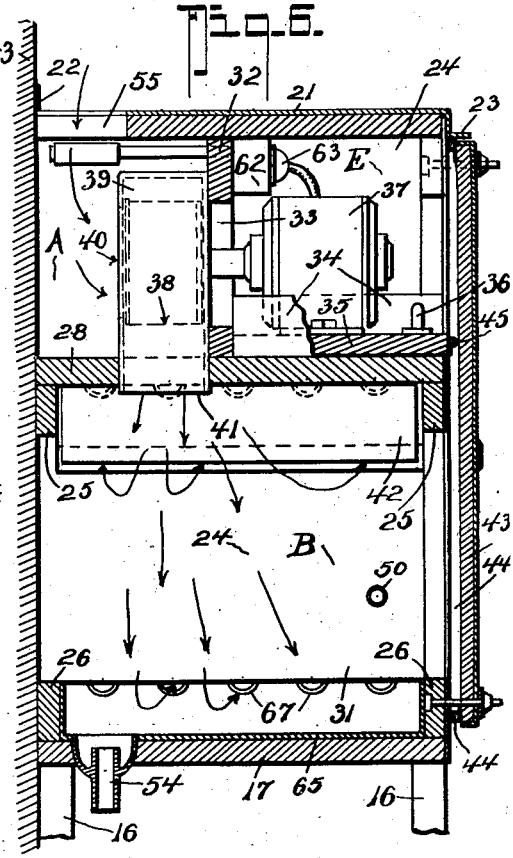
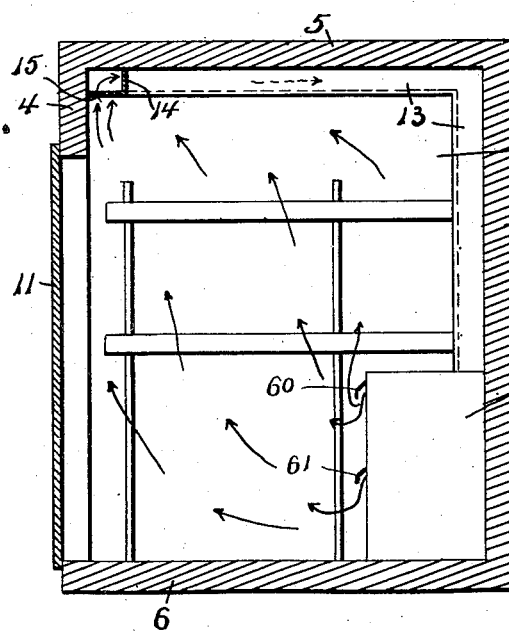
Inventor
George E. Friedrich
By Albert E. Dieterich
Attorney Patented Aug. 27, 1935

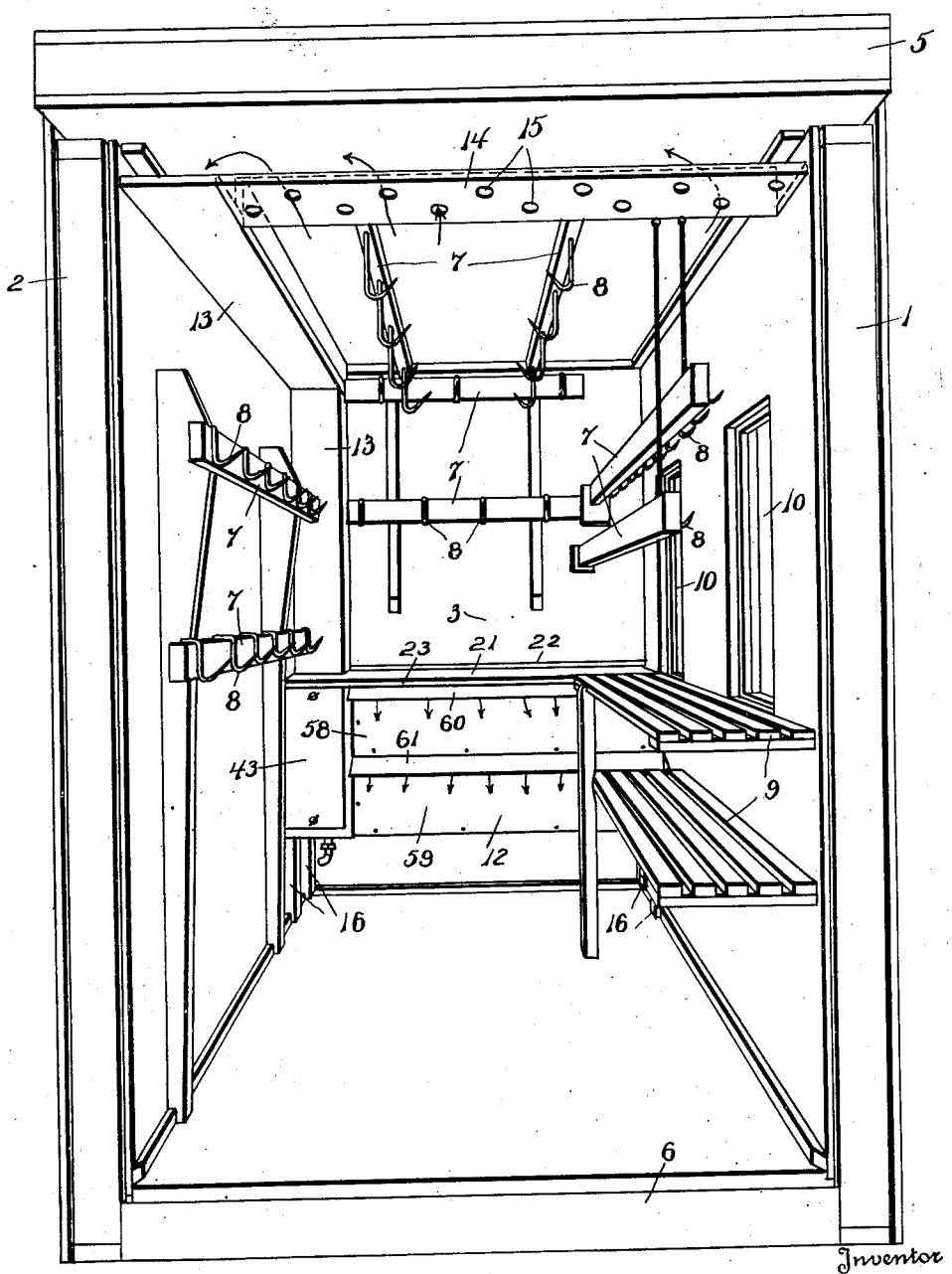

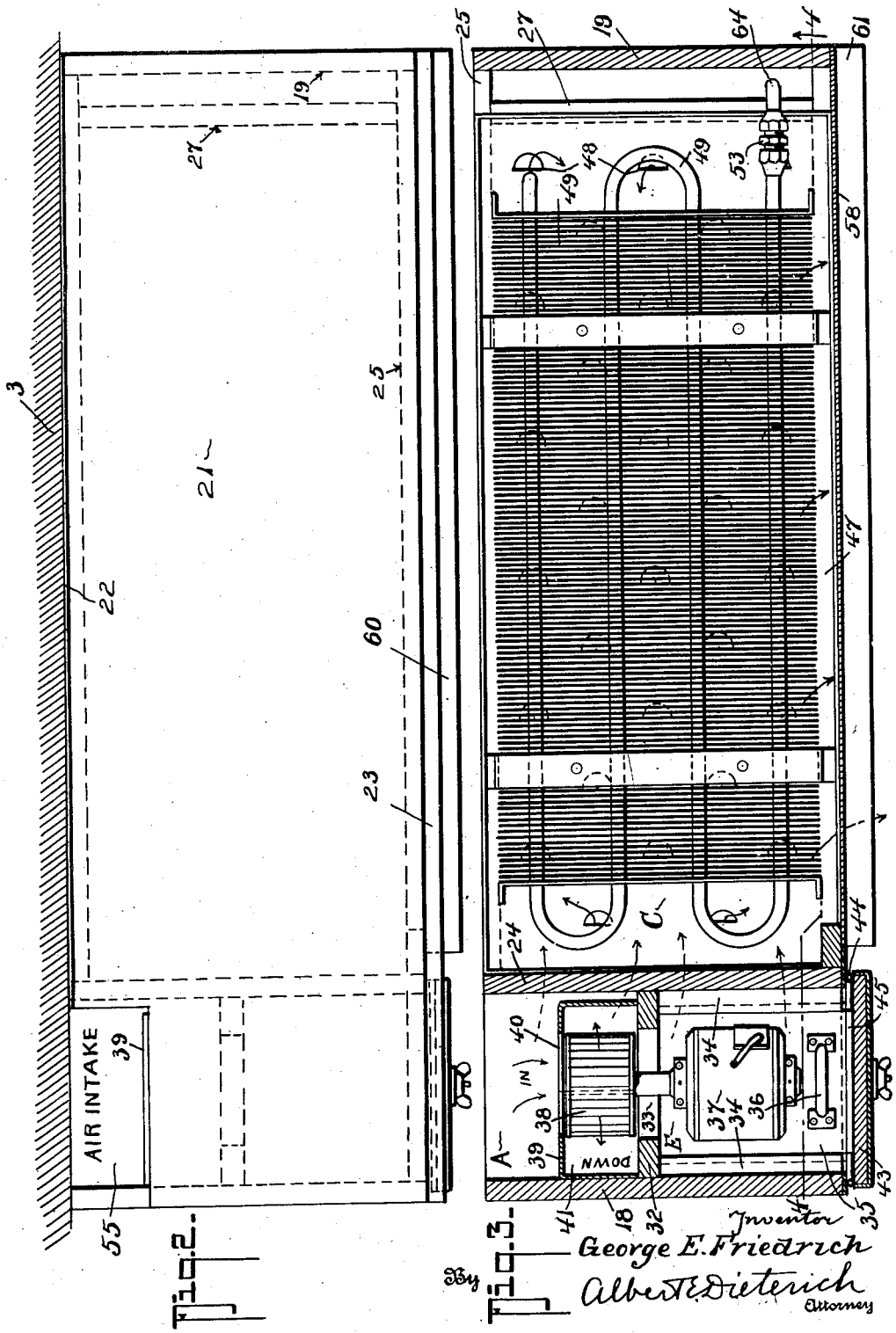

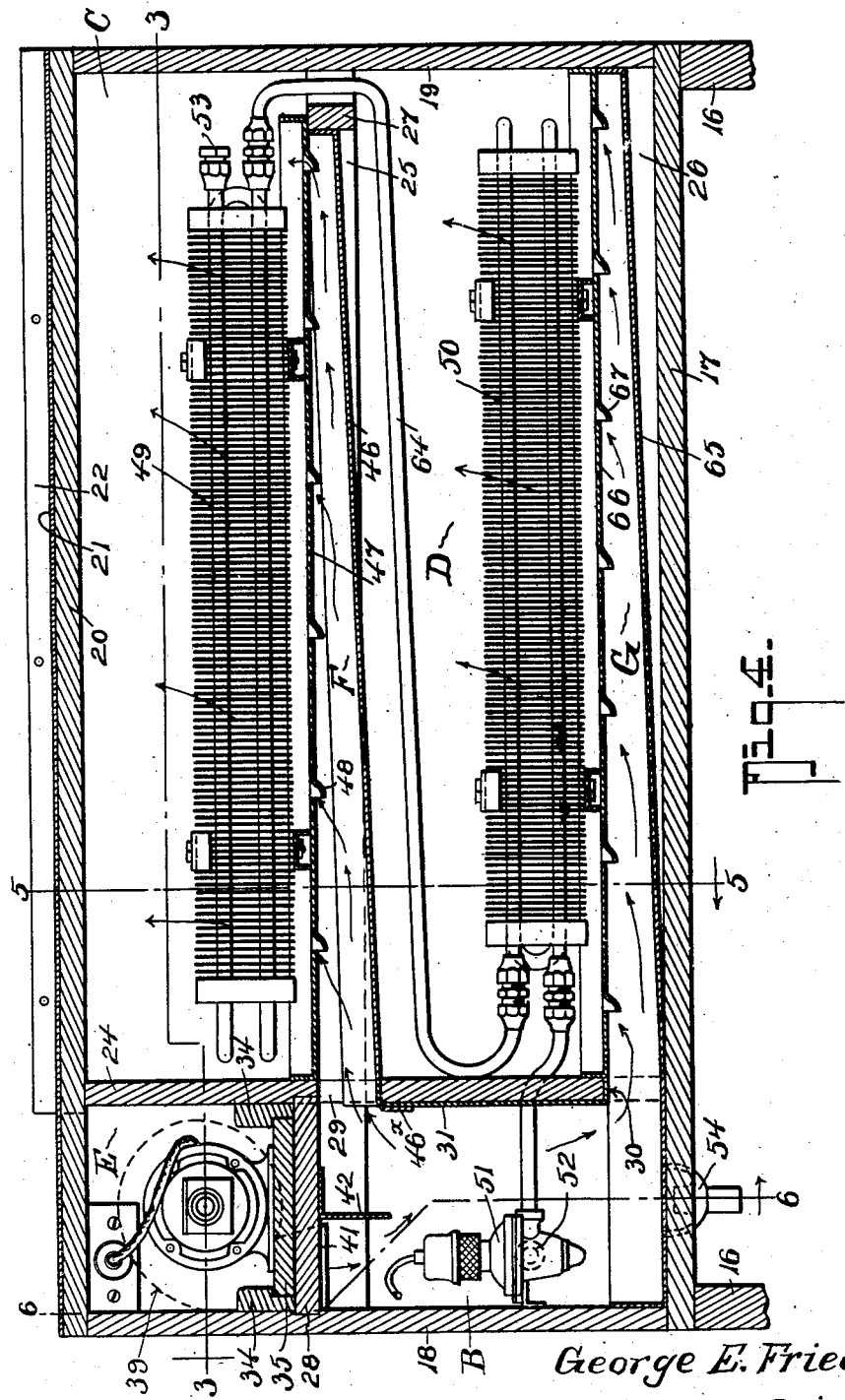

2,012,559

UNITED STATES PATENT OFFICE 2,012,559

BUTCHER'S MEAT COOLER

George E. Friedrich, San Antonio, Tex., assignor to Ed. Friedrich, San Antonio, Tex.

Application April 16, 1934, Serial No. 720,856

14 Claims. (Cl. 62—102)

My invention relates to the art of refrigeration and it has particular reference to butchers' meat coolers and the like, i. e., it has reference to a structure comprising a room-like chamber in which the meat is hung or suspended on suitable racks with hooks.

Primarily the invention has for an object to provide a cooler of large capacity with an air cooling unit located at one end, which unit is so constructed and designed as to occupy a minimum of space and also is designed to serve as a table or shelf on which meat may be laid.

Further, it is an object to provide a cooler with an air cooling and circulating unit so arranged and constructed as to act with maximum efficiency in cooperation with a front air duct, to provide as nearly a uniform temperature throughout the chamber of the cooler as it is possible to obtain.

A further object of the invention is to provide an air cooling unit for meat coolers which will utilize the principles of air circulation found in my Patent No. 1,893,769 issued January 10, 1933, and adopt the same for use in a butcher's meat cooler.

A further object is to provide an air cooling and circulating unit of an improved construction leading to greater efficiency, lower costs and minimum up-keep.

Other objects will in part be obvious and in part be pointed out hereinafter.

To the attainment of the aforesaid objects and ends the invention still further resides in the novel details of construction, combination and arrangement of parts, all of which will be first fully described in the following detailed description, then be particularly pointed out in the appended claims, reference being had to the accompanying drawings, in which:

Figure 1 is a perspective view of a butcher's meat cooler embodying my invention, one end wall (and its entrance door) being removed.

Figure 2 is a top plan view of the air cooling and circulating unit.

Figure 3 is a horizontal section of the same on the line 3—3 of Figure 4.

Figure 4 is a vertical section of the same on the line 4—4 of Figure 3.

Figure 5 is a cross section on the line 5—5 of Figure 4.

Figure 6 is a cross section on the line 6—6 of Figure 4.

Figure 7 is a diagrammatic vertical section of the meat cooler illustrating the overflow.

In the drawings, in which like numerals of reference indicate like parts in all of the figures, 1 represents the front wall of the cooler, 2 the rear wall, 3 and 4 the respective end walls, 5 the top wall and 6 the bottom wall or floor.

Within the chamber enclosed by these walls, are suitably located racks 7 whose hooks 8 are designed to receive the meat and hold it suspended so as to allow free air circulation around the meat. The front wall 1 has suitably located openings 10 which are provided with doors (preferably transparent) through which the butcher can reach into the cooler for the purpose of removing or replacing such meat as may be within his reach. The end wall 4 is provided with an entrance door 11 (see Figure 7) through which one may gain access to the interior of the cooler. Shelves 9 are suitably located inside the cooler at places found most convenient.

In the eight foot by six foot cooler I preferably use six inch walls containing four inch thick sheet cork insulation.

The outer surface of the cooler may be covered with a sheathing of porcelain enamelled metal or it may be painted with enamel paint, and decorated in any way that may be desired to give an attractive appearance.

The cooling and air circulating unit

The cooling and air circulating unit, which constitutes an essential part of my invention, is located at the end of the cooler that is opposite the end having the entrance door, namely it is located against the end wall 3. The cooling unit 12 rests on supports 16 of any suitable height which space it from the floor, the wall 3 serving as the back wall of the unit, as will hereinafter more fully appear.

The warm air in the cooler is gathered into the ported section 14 of the front air duct 13 through the inlet holes 15 and conveyed to the inlet 55 of the unit 12, as will also more fully appear hereafter. The ported section 14 of the front air duct is located across the top of the cooler at the end farthest from the unit 12 and diagonally opposite the same, while the duct 13 extends along the top adjacent the rear wall 2 and down against the end wall 3 to the inlet 55.

The unit 12 comprises a floor 17, end walls 18 and 19 and a top wall 20. The top wall is preferably covered by a porcelain enamelled sheath 21 having a back flange 22 which may be secured to the wall 3 by screws or other suitable means. The cover 21 has a front angle flange 23 lapping over the upper vizor or air deflector 60.

The box-like structure formed by the walls 17-20, inclusive, and the back wall 3 (the back wall 3 constitutes also the back wall of the unit 12) is sub-divided by a cross partition wall 24, a horizontal wall 28 and a vertical wall 32 into chambers A, B, C, D, and E.

The chamber A is the return air chamber in which the blower 38 is located; the chamber B is the air distributing chamber into which the blower forces air from chamber A; the chambers C and D are respectively the upper and lower cooling chambers; and chamber E is the motor chamber in which the motor that drives the blower is located.

Stringers 25 and 26 are provided to support the upper and lower refrigerating coils and the pans beneath the same, a cross beam 27 being located a short distance from the wall 19 between the stringers 25—25, thereby providing a passage for the coil connecting pipe 64.

The partition 24 between the stringers 25—25 has a rectangular opening 29 which constitutes an air passage and it has another similar opening 30 adjacent the floor 17 and between stringers 26—26 also to serve as an air passage. The face of the wall 24 within the chamber B is preferably sheathed with a suitable metal plate 31 preferably of a non-corrosive metal such as copper, monel metal or porcelain covered metal.

The wall 32 has a circular opening 33 just large enough to permit the insertion and withdrawal of the blower 38 therethrough. Slideways 34 are provided to steady the motor carrying slide 35, the slide having a handle 36 by means of which it may be pulled out of an opening in the front of the unit.

The motor 37 is securely mounted on the slide 35 and has its shaft extended to carry the blower 38. A housing 39 for the blower (which blower is of the centrifugal type) is secured to the wall 32 within the chamber A and this housing has an inlet opening 40 and an air discharge outlet 41, the latter passing down through an opening in the partition 28 and directing the air down into chamber B. A baffle 42 prevents direct passage of the air from the blower into the duct F.

The chambers E and B are closed by a suitable door 43 having a marginal gasket 44. The slide 35 also has a gasket 45 on its front edge to stop flow of air from chamber B into chamber E.

The upper air duct F is formed by the channel-like pan 46 that is mounted between the stringers 25—25 and cross beam 27 and extends into the opening 29. The pan has a lip 46x overlying the sheathing 31. The top of the duct F is constituted by the pan 47 which rests on the stringers 25—25 and beam 27 and has its bottom formed with numerous air-scoop openings 48. The duct F is of greatest cross sectional area at the entrance opening 29 and of least cross sectional area adjacent the beam 27, thereby ensuring an even distribution of air to the various scoops 48. The pan 47 supports the upper cooling coil unit 49 which may be of any approved construction.

A trough-shaped metal element 65 extends from the wall 18 through the opening 30 to the wall 19 and is located between the stringers 26—26 to cooperate with the metallic pan 66 and comprise the lower air duct G. The pan 66, like the pan 47, has air-scoop openings 67 at regular intervals and the cross sectional area of the duct G is greatest at the opening 30 and least adjacent the wall 19 thereby causing an even distribution of air to the scoops 67. The pan 66 supports the lower cooling coil unit 50, also of any approved construction. The two coil units 49 and 50 are connected by a pipe 64.

The lower coil unit 50 is connected to a temperature control (circulation regulating valve) 51 which is mounted in the chamber B. The port 52 of the valve 51 and the terminal 53 of the cooling coil unit 49 when in use are connected to a suitable refrigerant circulating system (not shown).

Water of condensation from the pans 46 and 66 and ducts F and G is passed out through a suitable drain 54.

The chilled air from the chambers C and D is passed out through the outlets 56—57 respectively in the front of the unit 12. The fronts of the chambers C and D, save for the outlets 56—57, are covered by metal porcelain plates 58—59 respectively, vizors 60 and 61 serving to shield the outlets 56—57 and deflect the air downwardly (see Figures 5 and 7).

62 represents a plug receptacle to which the current lead-in wires from a source of supply go and to which the motor leads are connected by a plug 63 (see Figure 6).

From the foregoing, it will be seen that when the motor 37 is turned on the plug 38 will draw air into the duct 14—13 via holes 15 from the interior of the cooler chamber adjacent one top end and force it through chamber B and ducts F and G of the cooling unit into chambers C and D in contact with the cooling coil units 49 and 50, the cool air being passed out through the elongated front outlets 56—57 and deflected downwardly toward the floor near the end where the unit 12 is located and diagonally opposite the place where the warm air is received through the openings 15. This circulation of the chilled air gives a very uniform temperature to the interior of the cooler and tends to keep the entire meat content at a uniform temperature.

The cover or door 43 is removably mounted so that access to the motor may be conveniently had for lubricating purposes as the motor will require lubrication at stated intervals, or if it be desired to remove the motor and plug for any purpose in that event the plug 63 is pulled out; the slide 35 withdrawn by the use of the handle 36 and the blower 38 will pass through the hole 33.

From the foregoing description, taken in connection with the accompanying drawings, it is thought the construction, operation and advantages of my invention will be clear to those skilled in the art.

I claim:

1. In a butcher's meat cooler, a chamber having a front, a back, end, top and bottom walls, meat suspending racks mounted within the chamber and having hooks on which the meat may be hung, an air cooling and circulating unit located at one end of the chamber, said unit having cold air outlets for delivering air into the chamber adjacent the bottom thereof, a return-air duct having inlet openings located adjacent the top of the chamber at the end opposite that where the cooling and circulating unit is located, said chamber having at least one opening closed by a door, said cooling and circulating unit being so positioned as to serve as a table or shelf on which meat may be placed.

2. In a butcher's meat cooler, a chamber having a front, a back, end, top and bottom walls, meat suspending racks mounted within the chamber and having hooks on which the meat may be hung, an air cooling and circulating unit located at one end of the chamber, said unit having cold air outlets for delivering air into the chamber adjacent the bottom thereof, a return-air duct having inlet openings located adjacent the top of the chamber at the end opposite that where the cooling and circulating unit is located, said chamber having at least one opening closed by a door, said cooling and circulating unit being located across one end of the chamber from the front wall to the back wall thereof, the adjacent end wall of the chamber serving also as the back wall of the unit, the front wall of the unit having cold air outlets.

3. An air cooling and circulating unit for butchers' meat coolers and the like, comprising an elongated body having a front wall, end walls, a top and a bottom, partitions dividing said body into a return-air chamber, an air distributing chamber, and at least one air cooling chamber, said body having a return-air receiving opening for receiving air from the outside of the unit to said return-air chamber and having an outlet in its front wall from said cooling chamber to the outside of the unit, a blower in said return-air chamber, an air cooling unit in said air cooling chamber, and means to drive said blower to draw air into said return-air chamber and force it into said air distributing chamber and from thence through said air cooling chamber and through the outlet thereof.

4. An air cooling and circulating unit for butchers' meat coolers and the like, comprising an elongated box-like body having a vertical cross partition adjacent one end and a horizontal partition between said cross partition and said one end and a vertical longitudinal partition above said horizontal partition, said partitions dividing said body into a plurality of chambers, a blower in the first of said chambers for delivering air into a second of said chambers, an air cooling unit in a third of said chambers, a duct conveying air from said second chamber into said third chamber and passing the air upwardly through said cooling unit, said body having a cold air outlet in one of its walls from said third chamber to the outside of the unit and having a return-air opening into said first chamber from the outside of the unit, means in one of said chambers for driving said blower.

5. An air cooling and circulating unit for butchers' meat coolers and the like, comprising an elongated box-like body having a bottom, a top and end walls, a vertical cross partition wall adjacent one end wall, a horizontal cross partition wall between said vertical cross partition and said one end wall, said partitions dividing said body into a plurality of chambers, a door secured to said body over the front of those chambers that are located between said vertical cross partition and said one end wall, front closure plates for the chamber that is located between said vertical cross partition and the other end wall, said plates having a horizontal cold air outlet, a rear wall for said body, the top of said body having a return-air inlet to the first of said chambers, a blower located in said first chamber for receiving air from said inlet and delivering it into a second of said chambers for distributing to a third of said chambers, an air cooling unit in the third chamber through which the air is forced to flow to said cold air outlet, a motor for driving said blower, and an air duct leading from said second chamber into said third chamber to deliver the air to said cooling unit.

6. An air cooling and circulating unit for meat coolers and the like comprising in combination with the cooler, a unit consisting of a body having a top, a bottom, end walls, a front wall and a back wall and having partitions inside which divide the unit into an upper and a lower cooling chamber, an upper return-air chamber and a motor chamber and a lower distributing chamber, said unit having a return-air inlet to said return-air chamber and a cold air outlet from each cooling chamber, a blower and motor within said return-air and motor chambers, respectively, the blower serving to deliver air to said distributing chamber and being driven by said motor, a cooling coil unit in each cooling chamber, means connecting said cooling coils in circuit with one another, ducts for conveying air from said distributing chamber to each cooler unit, deflecting means to restrain air from passing directly from the blower into the duct for the upper cooling unit, said air ducts each including an upper wall having air-scoop openings and formed to drain into said air distributing chamber, and a drain outlet from said air distributing chamber.

7. An air cooling and circulating unit for meat coolers and the like comprising in combination with the cooler, a unit consisting of a body having a top, a bottom, end walls, a front wall and a back wall and having partitions inside which divide the unit into an upper and a lower cooling chamber, an upper return-air chamber and a motor chamber and a lower distributing chamber, said unit having a return-air inlet to said return-air chamber and a cold air outlet from each cooling chamber, a blower and motor within said return-air and motor chambers, respectively, the blower serving to deliver air to said distributing chamber and being driven by said motor, a cooling coil unit in each cooling chamber, means connecting said cooling coils in circuit with one another, ducts for conveying air from said distributing chamber to each cooler unit, deflecting means to restrain air from passing directly from the blower into the duct for the upper cooling unit, said air ducts each including an upper wall having air-scoop openings and formed to drain into said air distributing chamber, a drain outlet from said air distributing chamber, said blower comprising a stationary housing and a rotating blower proper, the latter being carried on the shaft of said motor, a slide on which said motor is mounted and means for guiding said slide for removal and replacement of the slide-motor-blower proper as a unit.

8. An air cooling and circulating unit for meat coolers and the like comprising in combination with the cooler, a unit consisting of a body having a top, a bottom, end walls, a front wall and a back wall and having partitions inside which divide the unit into an upper and a lower cooling chamber, an upper return-air chamber and a motor chamber and a lower distributing chamber, said unit having a return-air inlet to said return-air chamber and a cold air outlet from each cooling chamber, a blower and motor within said return-air and motor chambers, respectively, the blower serving to deliver air to said distributing chamber and being driven by said motor, a cooling coil unit in each cooling chamber, means connecting said cooling coils in circuit with one another, ducts for conveying air from said distributing chamber to each cooler unit, deflecting means to restrain air from passing directly from the blower into the duct for the upper cooling unit, said air ducts each comprising a trough-like body and a pan over the same, the trough-like body and pan enclosing an air passage having its entrance at the air distributing chamber, the pan having a set of air-scoop openings for delivering air beneath the adjacent cooling unit.

9. An air cooling and circulating unit for meat coolers, which includes end walls, a bottom, a top, a front wall and a back wall, inside partitions dividing the unit into a return-air chamber, an air distributing chamber beneath said air-return chamber, an upper and a lower cooling chamber to one side of the aforesaid chambers, a blower casing mounted in said return-air chamber for delivering air into said air distributing chamber, a blower-rotor in said casing, a motor for driving said blower-rotor, said blower casing having an inlet for return air and an outlet which delivers air to said distributor, stringers extending in upper and lower pairs between the end walls, pans having air-scoop openings in the bottom mounted on said stringers in the cooling chamber, trough-like elements located between said stringers and cooperating with said pans to provide air ducts leading from said distributing chamber, cooling coil units supported by said pans, means to which said coil units may be connected in a cooling medium circuit, the front of said unit having cold air outlet slots.

10. An air cooling and circulating unit for meat coolers which includes end walls, a bottom, a top, a front wall and a back wall, inside partitions dividing the unit into a return-air chamber, an air distributing chamber beneath said air-return chamber, an upper and a lower cooling chamber to one side of the aforesaid chambers, a blower casing mounted in said return-air chamber for delivering air into said air distributing chamber, a blower-rotor in said casing, a motor for driving said blower-rotor, said blower casing having an inlet for return air and an outlet which delivers air to said distributor, stringers extending in upper and lower pairs between the end walls, pans having air-scoop openings in the bottom mounted on said stringers in the cooling chamber, trough-like elements located between said stringers and cooperating with said pans to provide air ducts leading from said distributing chamber, cooling coil units supported by said pans, means to which said cooling coil units may be connected in a cooling medium circuit, the front of said unit having cold air outlet slots, the lower of said trough-like elements extending over the bottom of said distributing chamber as a drain pan, and a drain outlet duct from said drain pan.

11. An air cooling and circulating unit for meat coolers and the like comprising in combination with the cooler, a unit consisting of a body having a top, a bottom, end walls, a front wall and a back wall and having partitions inside which divide the unit into an upper and a lower cooling chamber, an upper return-air chamber and a motor chamber and a lower distributing chamber, said unit having a return-air inlet to said return-air chamber and a cold air outlet from each cooling chamber, a blower and motor within said return-air and motor chambers, respectively, the blower serving to deliver air to said distributing chamber and being driven by said motor, a cooling coil unit in each cooling chamber, means connecting said cooling coils in circuit with one another, a regulating valve in said distributing chamber and connected in said circuit of the cooling units, ducts for conveying air from said distributing chamber to each cooling unit, deflecting means to restrain air from passing directly from the blower into the duct for the upper cooling unit, said air ducts each including an upper wall having air-scoop openings and formed to drain into said air distributing chamber, and a drain outlet from said air distributing chamber.

12. An air cooling and circulating unit for butchers' meat coolers and the like, comprising an elongated body having a front wall, end walls, a top and a bottom, the back of said body being designed to be set up against a wall of the cooler and to be closed thereby, partitions dividing said body into a return-air chamber, an air distributing chamber and at least one air cooling chamber, said body having a return-air receiving opening from the outside of the unit to said return-air chamber and having an outlet in its front wall from said cooling chamber to the outside of the unit, a blower in said return-air chamber, an air cooling unit in said air cooling chamber, and means to drive said blower to draw air into said return-air chamber and force it into said air distributing chamber and from thence through said air cooling chamber and through the outlet thereof.

13. In an air cooling and circulating unit for meat coolers and the like, a body having a top, a bottom, end walls, a front wall and a back wall having partitions inside which divide the unit into an upper return-air chamber, a motor chamber and a lower distributing chamber and a cooling chamber, said unit having a return-air inlet to said return-air chamber and a cold air outlet from said cooling chamber, a blower and motor within said return-air and motor chambers respectively, the blower serving to deliver air to said distributing chamber and being driven by said motor, a cooling coil unit in said cooling chamber, a regulating valve in said distributing chamber and connected in circuit with said cooling unit, a duct for conveying air from said distributing chamber to said cooling unit, said duct including an upper wall having openings and formed to drain toward said air distributing chamber, and a drain outlet from said air distributing chamber.

14. In an air cooling and circulating unit for meat coolers and the like, a body having a top, a bottom, end walls, a front wall and a back wall having partitions inside which divide the unit into an upper return-air chamber, a motor chamber and a lower distributing chamber and a cooling chamber, said unit having a return-air inlet to said return-air chamber and a cold air outlet from said cooling chamber, a blower and motor within said return-air and motor chambers respectively, the blower serving to deliver air to said distributing chamber and being driven by said motor, a cooling coil unit in said cooling chamber, a regulating valve in said distributing chamber and connected in circuit with said cooling unit, a duct for conveying air from said distributing chamber to said cooling unit, said duct including an upper wall having openings and formed to drain toward said air distributing chamber, a drain outlet from said air distributing chamber, said front wall including a door to permit access to the interior of said motor and distributing chambers.

GEORGE E. FRIEDRICH.